United States Patent
Cho et al.

(10) Patent No.: US 8,992,660 B2
(45) Date of Patent: Mar. 31, 2015

(54) METHOD FOR FABRICATING HOLLOW METAL NANO PARTICLES AND HOLLOW METAL NANO PARTICLES FABRICATED BY THE METHOD

(71) Applicant: LG Chem, Ltd., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/344,258

(22) PCT Filed: May 10, 2013

(86) PCT No.: PCT/KR2013/004177
§ 371 (c)(1),
(2) Date: Mar. 14, 2014

(87) PCT Pub. No.: WO2013/169078
PCT Pub. Date: Nov. 14, 2013

(65) Prior Publication Data
US 2014/0308537 A1    Oct. 16, 2014

(30) Foreign Application Priority Data

May 11, 2012  (KR) ........................ 10-2012-0050483
Jan. 30, 2013  (KR) ........................ 10-2013-0010526

(51) Int. Cl.
*B22F 9/24*  (2006.01)
*C22C 5/04*  (2006.01)
(Continued)

(52) U.S. Cl.
CPC ............. *C22C 5/04* (2013.01); *B22F 2304/054* (2013.01); *C01P 2004/34* (2013.01); *B22F 2304/052* (2013.01); *B22F 2304/05* (2013.01); *B22F 2001/0029* (2013.01); *B22F 1/0018* (2013.01);
(Continued)

(58) Field of Classification Search
CPC ............ B22F 1/0051; B22F 9/20; B22F 9/24; B22F 2001/0029; B22F 2009/24; B22F 2304/054; C01P 2004/34
See application file for complete search history.

(56) References Cited

U.S. PATENT DOCUMENTS 6,752,979 B1    6/2004  Talbot et al.
7,374,599 B1 *  5/2008  Shelnutt et al. ................. 75/370
(Continued)

FOREIGN PATENT DOCUMENTS

JP  2006045582 A   2/2006
KR  1020070001137 A  3/2007
(Continued)

OTHER PUBLICATIONS

X. Zheng et al., "Formation of vesicle-templated CdSe hollow spheres in an ultrasound-induced anionic surfactant solution," Ultrasonics Sonochemistry, 9, 2002, pp. 311-316.*
(Continued)

*Primary Examiner* — Scott Kastler
*Assistant Examiner* — Vanessa Luk
(74) *Attorney, Agent, or Firm* — McKenna Long & Aldridge LLP

(57) ABSTRACT

The present application provides a method for fabricating hollow metal nano particles and hollow metal nano particles fabricated by the same.

29 Claims, 10 Drawing Sheets

(51) Int. Cl.
*B82Y 30/00* (2011.01)
*B22F 1/00* (2006.01)

(52) U.S. Cl.
CPC ............... *B22F 9/24* (2013.01); *B22F 1/0044* (2013.01); *B22F 1/0051* (2013.01); *B82Y 30/00* (2013.01)
USPC .......................................................... 75/370

(56) References Cited

U.S. PATENT DOCUMENTS

| | | | |
|---|---|---|---|
| 7,608,237 B2 * | 10/2009 | Alexandridis et al. | 423/508 |
| 2007/0031322 A1 | 2/2007 | Edwards et al. | |
| 2008/0096986 A1 * | 4/2008 | Thomazeau et al. | 518/716 |
| 2010/0143721 A1 * | 6/2010 | Chen et al. | 428/407 |

FOREIGN PATENT DOCUMENTS

| | | |
|---|---|---|
| KR | 1020110040006 A | 4/2011 |
| KR | 1020120036396 A | 4/2012 |

OTHER PUBLICATIONS

Y. Vasquez et al., "One-Pot Synthesis of Hollow Superparamagnetic CoPt Nanospheres," Journal of the American Chemical Society, 127, 2005, pp. 12504-12505 (published on Web Aug. 17, 2005).*

Y. Vasquez et al., "One-Pot Synthesis of Hollow Superparamagnetic CoPt Nanospheres," Journal of the American Chemical Society, 127, 2005, pp. 12504-12505 (published on Web Aug. 17, 2005)—Supporting Information.*

G. Chen et al., "Facile Synthesis of Co—Pt Hollow Sphere Electrocatalyst," Chemistry of Materials, 19, 2007, pp. 1840-1844 (published on Web Mar. 10, 2007).*

Zheng X et al, "Formation of vesicle-templated CdSe hollow spheres in an ultrasound-induced anionic surfactant solution", Ultrason Sonochem. Nov. 2002 9(6) 311-6.

K.M.A. Hague et al. "African Journal of Pure and Applied Chemistry" vol. 4(5), pp. 58-63, May 2010.

Pal et al., "Shape controlled synthesis of iron-cobalt alloy magnetic nanoparticles using soft template method", Material Letters 64, (2010) pp. 1127-1129.

* cited by examiner

METHOD FOR FABRICATING HOLLOW METAL NANO PARTICLES AND HOLLOW METAL NANO PARTICLES FABRICATED BY THE METHOD

CROSS-REFERENCE TO RELATED APPLICATIONS

This application is a 35 USC §371 National Stage entry of International Application No. PCT/KR2013/004177, filed on May 10, 2013, which claims priority of Korean Application No. 10-2012-0050483, filed on May 11, 2012, and Korean Application No. 10-2013-0010526, filed on Jan. 30, 2013, all of which are hereby incorporated by reference in their entirety.

TECHNICAL FIELD

The present application relates to a method for fabricating hollow metal nano particles and hollow metal nano particles fabricated by the method.

BACKGROUND ART

Nano particles are particles having a nano-scaled particle size, and exhibit optical, electric, and magnetic characteristics completely different from those of a bulk-state material due to a quantum confinement effect in which the energy required for electron transfer is changed depending on the size of material, and a large specific surface area. Thus, due to these properties, much interests have been focused on the applicability in the fields of catalysts, electro-magnetics, optics, medicine, and the like. Nano particles may be an intermediate between bulk and molecule, and in terms of an approach in two ways, that is, a "Top-down" approach and a "Bottom-up" approach, it is possible to synthesize nano particles.

Examples of a method for synthesizing metal nano particles include a method for reducing metal ions with a reducing agent in a solution, a method using gamma rays, an electrochemical method, and the like. However, methods in the related art are problematic in that it is difficult to synthesize nano particles having a uniform size and shape, or the use of an organic solvent leads to environmental pollution, high costs, and the like. For these various reasons, it was difficult to economically mass-produce high-quality nano particles.

Meanwhile, in order to fabricate hollow metal nano particles in the related art, hollow metal nano particles have been fabricated by synthesizing particles with a low reduction potential, such as Ag, Cu, Co, and Ni, substituting the surface of particles, such as Ag, Cu, Co, Ni, or the like with a metal having a higher reduction potential than the particles with a low reduction potential, for example, Pt, Pd, or Au by a potential difference substitution method, and after the surface substitution, melting Ag, Cu, Co, Ni, and the like remaining inside the particles through an acid treatment. In this case, there is a problem in the process in that a post-treatment needs to be performed with an acid. Since the potential difference substitution method is a natural reaction, there are few factors that may be controlled, and thus it is difficult to fabricate uniform particles. Therefore, there is a need for a method for fabricating uniform hollow metal nano particles, which is easier than the methods in the related art.

SUMMARY OF THE INVENTION

The present application has been made in an effort to provide a method for fabricating hollow metal nano particles, which generates no environmental pollution and is capable of easily implementing mass production with relatively low costs.

Further, the present application has been made in an effort to provide hollow metal nano particles fabricated by the fabrication method.

The problems of the present application to be solved are not limited to the aforementioned technical problems, and other technical problems, which have not been mentioned, may be obviously understood by a person with ordinary skill in the art from the following description.

An exemplary embodiment of the present application include a method for fabricating hollow metal nano particles, the method including: forming a solution by adding a first metal salt, a second metal salt, and a surfactant to a solvent; and forming hollow metal nano particles by adding a reducing agent to the solution, in which the forming of the solution includes forming a micelle by the surfactant, and surrounding an outer portion of the micelle with the first metal salt and the second metal salt, and the forming of the hollow metal nano particles includes forming the micelle region to a hollow form.

An exemplary embodiment of the present application provides hollow metal nano particles fabricated by the fabrication method.

The present application is advantageous in that it is possible to mass-produce hollow metal nano particles having a uniform size of several nanometers, there is a cost reduction effect, and no environmental pollution is generated in the fabrication process.

DETAILED DESCRIPTION

Figure 1:
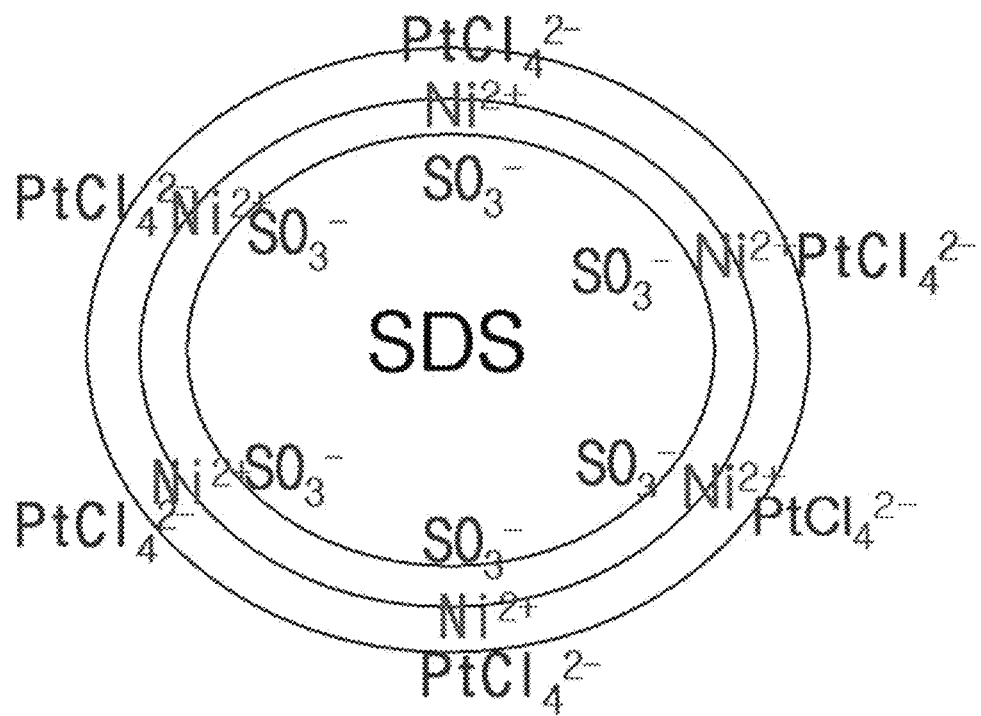
FIG. 1 illustrates a model of hollow metal nano particles fabricated according to Example 1.

The advantages and features of the present application, and methods of accomplishing these will become obvious with reference to the exemplary embodiments to be described below in detail along with the accompanying drawings. However, the present application is not limited to exemplary embodiments to be disclosed below, but will be implemented in various forms different from each other. The exemplary embodiments are merely intended to make the disclosure of the present application complete and provided to completely notify the scope of the invention to the person with ordinary skill in the art to which the present application belongs, and the present application is only defined by the scope of the claims. The size and relative size of the constituent elements marked in the drawings may be exaggerated for clarity of description.

Unless otherwise defined, all terms (including technical and scientific terms) used in the present specification may be used as the meaning which may be commonly understood by the person with ordinary skill in the art to which the present application belongs. It will be further understood that terms defined in commonly used dictionaries should not be interpreted ideally or excessively unless expressly and specifically defined.

Hereinafter, the present application will be described in detail.

In the present specification, hollow means that the core parts of hollow metal nano particles are empty. In addition, the hollow may also be used as the same meaning as a hollow core. The hollow includes the terms of hollow, hole, void, and porous. The hollow may include a space in which an internal material is not present by 50% by volume or more, specifically 70% by volume or more, and more specifically 80% by volume or more. Furthermore, the hollow may also include a space of which the inside is empty by 50% by volume or more, specifically 70% by volume or more, and more specifically 80% by volume or more. Further, the hollow includes a space having an internal porosity of 50% by volume or more, specifically 70% by volume or more, and more specifically 80% by volume.

The fabrication method according to an exemplary embodiment of the present application provides a method for fabricating hollow metal nano particles, the method including: forming a solution by adding a first metal salt, a second metal salt, and a surfactant to a solvent; and forming hollow metal nano particles by adding a reducing agent to the solution, in which the forming of the solution includes forming a micelle by the surfactant, and surrounding an outer portion of the micelle with the first metal salt and the second metal salt, and the forming of the hollow metal nano particles includes forming the micelle region to a hollow form.

The fabrication method according to an exemplary embodiment of the present application does not use a reduction potential difference, and thus is advantageous in that a reduction potential between a first metal and a second metal is not considered. Since charges between metal ions are used, the fabrication method is advantageous in that the method is simpler than the fabrication method in the related art, and thus facilitates mass production.

In an exemplary embodiment of the present application, the first metal salt is not particularly limited as long as the first metal salt may be ionized in a solution to provide metal ions of a first metal. The first metal salt may include the first metal. Here, the first metal may be different from a second metal.

Here, the first metal of the first metal salt may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and even more specifically, may be nickel (Ni).

In an exemplary embodiment of the present application, the second metal salt is not particularly limited as long as the second metal salt may be ionized in a solution to provide metal ions of the second metal. The second metal salt may include the second metal. Here, the second metal may be different from the first metal.

Here, the second metal of the second metal salt may be selected from the group consisting of metals belonging to Group 3 to Group 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal may be selected from the group consisting of platinum (Pt), palladium (Pt), and gold (Au), and even more specifically, may be platinum (Pt).

In an exemplary embodiment of the present application, the first metal salt and the second metal salt may be nitrate ($NO_3^-$), halide such as chloride ($Cl^-$), bromide ($Br^-$), and iodide ($I^-$), hydroxide ($OH^-$), or sulfate ($SO_4^-$) of the first metal and the second metal, respectively, but is not limited thereto.

According to an exemplary embodiment of the present application, the first metal and the second metal may form the hollow metal nano particles. Specifically, the first metal and the second metal may form a shell portion of the hollow metal nano particles, and the shell portion may include a first shell and a second shell.

Specifically, according to an exemplary embodiment of the present application, the shell portion may be formed of the first shell including the first metal and the second shell including the second metal.

Further, according to an exemplary embodiment of the present application, the first shell and the second shell may include different metals.

Alternatively, the shell portion of the present specification may include one shell including the first metal and the second metal.

The shell portion of the present application may be present on the entire surface outside of hollow portion, and may also be present in the form of surrounding the hollow portion. Specifically, according to an exemplary embodiment of the present application, the shell portion may be formed throughout on the outer side surface of hollow portion That is, the shell portion of the present application may constitute the forms of the hollow metal nano particles.

According to an exemplary embodiment of the present application, the shell portion of the hollow metal nano particles may be formed of a metal including the first metal and the second metal. That is, the shell portion of the hollow metal nano particles of the present application may be formed of a metal instead of a metal oxide.

According to an exemplary embodiment of the present application, the hollow metal nano particles may have a spherical shape. In this case, the form of the shell portion of the present application may have a spherical shape including a hollow core.

The spherical shape of the present application does not mean only a completely spherical shape, and may include an approximately spherical shape. For example, in the hollow metal nano particles, the spherically shaped outer surface may not be flat, and the radius of curvature in one hollow metal nano particle may not be uniform.

According to an exemplary embodiment of the present application, the first metal salt may be in the form of surrounding the outer surface of a surfactant forming a micelle. In addition, the second metal salt may be in the form of surrounding the first metal salt. The first metal salt and the second metal salt may form shell portions including the first metal and the second metal, respectively by a reducing agent.

In an exemplary embodiment of the present application, the molar ratio of the first metal salt to the second metal salt may be 1:5 to 10:1, specifically, 2:1 to 5:1. When the mole number of the first metal salt is smaller than the mole number of the second metal salt, it is difficult for the first metal to form a first shell including hollow portions. Furthermore, when the mole number of the first metal salt exceeds the mole number of the second metal salt by 10 times, it is difficult for the second metal salt to form a second shell surrounding the first shell.

According to an exemplary embodiment of the present application, the atomic percentage ratio of the first metal to the second metal of the shell portion may be 1:5 to 10:1. When the shell portion is formed of the first shell and the second shell, the atomic percentage ratio may be an atomic percentage ratio of the first metal of the first shell to the second metal of the second shell. Alternatively, the atomic percentage ratio may be an atomic percentage ratio of the first metal to the second metal when the shell portion is formed of one shell including the first metal and the second metal.

According to an exemplary embodiment of the present application, when the shell portion is formed of one shell including the first metal and the second metal, the first metal and the second metal may also be mixed uniformly or non-uniformly.

Alternatively, according to an exemplary embodiment of the present application, the shell portion may be present in a state where the first metal and the second metal are gradated, the first metal may be present in an amount of 50% by volume or more or 70% by volume or more at a portion adjacent to the hollow core in the shell portion, and the second metal may be present in an amount of 50% by volume or more or 70% by volume or more at a surface portion adjacent to the outer portion of nano particles in the shell portion.

According to an exemplary embodiment of the present application, the solvent may be a solvent including water. Specifically, in an exemplary embodiment of the present application, the solvent serves to dissolve the first metal salt and the second metal salt, and may be water or a mixture of water and a $C_1$ to $C_6$ alcohol, specifically, water. When water is used as a solvent in the present application, an organic solvent is not used, and thus a post-treatment process of treating an organic solvent in the fabrication process is not needed. Therefore, there are effects of reducing costs and preventing environmental pollution.

According to an exemplary embodiment of the present application, the surfactant may form a micelle in the solution.

It is possible to classify electric charges of the surfactant depending on the type of electric charge on the outer side surface of the micelle. That is, when the electric charge on the outer side surface of the micelle is anionic, the surfactant forming the micelle may be an anionic surfactant. Further, when the electric charge on the outer side surface of the micelle is cationic, the surfactant forming the micelle may be a cationic surfactant.

In an exemplary embodiment of the present application, the surfactant may be an anionic surfactant. Specifically, the anionic surfactant may be selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and salts thereof, glyceryl ester, sodium carboxymethylcellulose, bile acid and salts thereof, cholic acid, deoxycholic acid, glycocholic acid, taurocholic acid, glycodeoxycholic acid, alkyl sulfonate, aryl sulfonate, alkyl phosphate, alkyl sulfonate, stearic acid and salts thereof, calcium stearate, phosphate, sodium carboxymethyl cellulose, dioctyl sulfosuccinate, dialkyl ester of sodium sulfosuccinic acid, phospholipid and calcium carboxymethyl cellulose.

When the surfactant is an anionic surfactant, the outer side surface of the surfactant forming the micelle is anionically charged, and thus may be surrounded by the first metal salt that is cationally charged. Furthermore, the first metal salt may be surrounded by the second metal salt that is anionically charged.

According to an exemplary embodiment of the present application, the first metal salt that is cationically charged and the second metal salt that is anionically charged are not present in a region where the anionic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

In an exemplary embodiment of the present application, the surfactant may be a cationic surfactant. Specifically, the cationic surfactant may be selected from the group consisting of quaternary ammonium compounds, benzalkonium chloride, cetyl trimethyl ammonium bromide, chitonic acid, lauryl dimethyl benzyl ammonium chloride, acyl carnitine hydrochloride, alkyl pyridinium halide, cetylpyridinium chloride, cationic lipids, polymethylmethacrylate trimethyl ammonium bromide, sulfonium compounds, polyvinylpyrrolidone-2-dimethylaminoethyl methacrylate dimethyl sulfate, hexadecyl trimethyl ammonium bromide, phosphonium compounds, benzyl-di(2-chloroethyl)ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, $C_{12-15}$-dimethyl hydroxyethyl ammonium chloride, $C_{12-15}$-dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulphate, lauryl dimethyl benzyl ammonium chloride, lauryl dimethyl benzyl ammonium bromide, lauryl dimethyl (ethenoxy)$_4$ ammonium chloride, lauryl dimethyl (ethenoxy)$_4$ ammonium bromide, N-alkyl ($C_{12-18}$)dimethylbenzyl ammonium chloride, N-alkyl ($C_{14-18}$)dimethylbenzyl ammonium chloride, N-tetradecyldimethylbenzyl ammonium chloride monohydrate, dimethyl didecyl ammonium chloride, N-alkyl ($C_{12-14}$)dimethyl 1-naphthylmethyl ammonium chloride, trimethylammonium halide alkyl-trimethylammonium salts, dialkyl-dimethylammonium salts, lauryl trimethyl ammonium chloride, ethoxylated alkyamidoalkyldialkylammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12-14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromide, dodecylbenzyl triethyl ammonium chloride, polydiallyldimethylammonium chloride, dimethyl ammonium chloride, alkyldimethylammonium halogenide, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline esters, benzalkonium chloride, stearalkonium chloride, cetyl pyridinium bromide, cetyl pyridinium chloride, halide salts of quaternized polyoxyethylalkylamines, "MIRAPOL" (polyquaternium-2), "Alkaquat" (alkyl dimethyl benzylammonium chloride, manufactured by Rhodia), alkyl pyridinium salts, amine, amine salts, imide azolinium salts, protonated quaternary acrylamides, methylated quaternary polymers, cationic gua gum, benzalkonium chloride, dodecyl trimethyl ammonium bromide, triethanolamine, and poloxamine.

When the surfactant is a cationic surfactant, the outer side surface of the surfactant forming the micelle is cationically charged, and thus may be surrounded by the first metal salt that is anionically charged. Furthermore, the first metal salt may be surrounded by the second metal salt that is cationically charged.

According to an exemplary embodiment of the present application, the first metal salt that is anionically charged and the second metal salt that is cationically charged are not present in a region where the cationic surfactant forms a micelle, thereby forming hollow portions. That is, when the first metal salt and the second metal salt are formed of a shell portion including the first metal and the second metal by a reducing agent, the region constituting the micelle may become a hollow core that does not include a metal.

In an exemplary embodiment of the present application, when water is selected as the solvent, the concentration of surfactant in the solution may be one time or more and 5 times or less of the critical micelle concentration (CMC) to water.

When the concentration of the surfactant is one time less than the critical micelle concentration, the concentration of the surfactant adsorbed to the first metal salt may be relatively decreased. Accordingly, the amount of a surfactant forming a core to be formed may also be entirely decreased. Meanwhile, when the concentration of the surfactant is 5 times higher than the critical micelle concentration, the concentration of the surfactant is relatively increased, and thus the surfactant which forms the hollow core and metal particles which do not form the hollow core may be mixed and aggregated.

According to an exemplary embodiment of the present application, it is possible to control the size of the hollow metal nano particles by controlling the surfactant which forms the micelle and/or the first and second metal salts which surround the micelle.

According to an exemplary embodiment of the present application, it is possible to control the size of hollow metal nano particles by the chain length of the surfactant which forms the micelle. Specifically, when the chain length of the surfactant is short, the size of the micelle may be decreased and the hollow size may also be decreased, thereby decreasing the size of the hollow metal nano particles.

According to an exemplary embodiment of the present application, the carbon number of the chains of the surfactant may be 15 or less. Specifically, the carbon number of the chain may be 8 or more and 15 or less. Alternatively, the carbon number of the chain may be 10 or more and 12 or less.

According to an exemplary embodiment of the present application, it is possible to control the size of hollow metal nano particles by controlling the type of the counter ion of the surfactant which forms the micelle. Specifically, as the size of the counter ion of the surfactant is increased, the bonding strength of the outer end of the surfactant with the head portion thereof becomes weak, and thus the size of hollow portions may be increased. Accordingly, the size of hollow metal nano particles may be increased.

According to an exemplary embodiment of the present specification, when the surfactant is an anionic surfactant, the surfactant may include $NH_4^+$, $K^+$, $Na^+$, or $Li^+$ as a counter ion.

Specifically, the size of hollow nano particles may be decreased when the counter ion of the surfactant is $NH_4^+$, $K^+$, $Na^+$, or $Li^+$ in this order. This may be confirmed by the Examples to be described below.

According to an exemplary embodiment of the present specification, when the surfactant is a cationic surfactant, the surfactant may include $I^-$, $Br^-$, or $Cl^-$ as a counter ion.

Specifically, the size of hollow nano particles may be decreased when the counter ion of the surfactant is $I^-$, $Br^-$, or $Cl^-$ in this order.

According to an exemplary embodiment of the present application, it is possible to control the size of hollow metal nano particles by controlling the size of the head portion of the outer end of the surfactant which forms the micelle. Furthermore, when the size of the head portion of the surfactant formed on the outer surface of the micelle is increased, the repulsive force between head portions of the surfactant is increased, and thus the size of hollows may be increased. Accordingly, the size of hollow metal nano particles may be increased.

According to an exemplary embodiment of the present application, the size of hollow metal nano particles may be determined by complex action of the factors as described above.

According to an exemplary embodiment of the present application, the fabrication method may be carried out at normal temperature. Specifically, the fabrication method may be carried out at a temperature in a range from 4° C. to 35° C., more specifically, at 15° C. to 28° C.

In an exemplary embodiment of the present application, the forming of the solution may be carried out at normal temperature, specifically at a temperature in a range from 4° C. to 35° C., more specifically, at 15° C. to 28° C. When an organic solvent is used as the solvent, there is a problem in that the fabrication method is performed at a high temperature exceeding 100° C. Since the fabrication method may be carried out at normal temperature, the present application is advantageous in terms of process due to a simple fabrication method, and has a significant effect of reducing costs.

In an exemplary embodiment of the present application, the forming of the solution may be performed for 5 minutes to 120 minutes, more specifically for 10 minutes to 90 minutes, and even more specifically for 20 minutes to 60 minutes.

In an exemplary embodiment of the present application, the forming of the hollow metal nano particles by adding a reducing agent to the solution may also be carried out at normal temperature, specifically at a temperature in a range from 4° C. to 35° C., and more specifically at 15° C. to 28° C. Since the fabrication method may be carried out at normal temperature, the present application is advantageous in terms of process due to a simple fabrication method, and has a significant effect of reducing costs.

The forming of the hollow metal nano particles may be performed by reacting the solution with the reducing agent for a predetermined time, specifically for 5 minutes to 120 minutes, more specifically for 10 minutes to 90 minutes, and even more specifically for 20 minutes to 60 minutes.

In an exemplary embodiment of the present application, the reducing agent is not particularly limited as long as the reducing agent is a strong reducing agent having a standard reduction potential of −0.23 V or less, specifically from −4 V to −0.23 V, and has a reducing power which may reduce the dissolved metal ions to be precipitated as metal particles.

Such a reducing agent may be at least one selected from the group consisting of, for example, $NaBH_4$, $NH_2NH_2$, $LiAlH_4$, and $LiBEt_3H$.

When a weak reducing agent is used, a reaction speed is slow and a subsequent heating of the solution is required such that it is difficult to achieve a continuous process, and thus there may be a problem in terms of mass production. In particular, when ethylene glycol, which is one of weak reducing agents, is used, there is a problem in that the productivity is low in a continuous process due to a decrease in flow rate caused by high viscosity.

According to an exemplary embodiment of the present application, the forming of the hollow metal nano particles may be further adding a non-ionic surfactant.

In an exemplary embodiment of the present application, specifically, the non-ionic surfactant may be selected from the group consisting of polyoxyethylene fatty alcohol ether, polyoxyethylene sorbitan fatty acid ester, polyoxyethylene fatty acid ester, polyoxyethylene alkyl ether, polyoxyethylene castor oil derivatives, sorbitan ester, glyceryl ester, glycerol monostearate, polyethylene glycol, polypropylene glycol, polypropylene glycol ester, cetyl alcohol, cetostearyl alcohol, stearyl alcohol, aryl alkyl polyether alcohol, polyoxyethylene polyoxypropylene copolymers, poloxamer, poloxamine, methylcellulose, hydroxycellulose, hydroxymethylcellulose, hydroxyethylcellulose, hydroxypropylcellulose, hydroxypropylmethylcellulose, hydroxypropylmethylcellulose phthalate, noncrystalline cellulose, polysaccharides, starch, starch derivatives, hydroxyethyl starch, polyvinyl alcohol, triethanolamine stearate, amine oxide, dextran, glycerol, gum acacia, cholesterol, tragacanth, and polyvinylpyrrolidone.

The non-ionic surfactant is adsorbed on the surface of the shell, and thus serves to uniformly disperse the hollow metal nano particles formed in the solution. Thus, the non-ionic surfactant may prevent hollow metal particles from being conglomerated or aggregated so as to be precipitated and allow hollow metal nano particles to be formed in a uniform size.

According to an exemplary embodiment of the present application, the forming of the hollow metal nano particles may be further adding a stabilizer.

In an exemplary embodiment of the present application, specifically, the stabilizer may include one or two or more selected from the group consisting of disodium phosphate, dipotassium phosphate, disodium citrate, and trisodium citrate.

In an exemplary embodiment of the present application, the particle diameter of a plurality of hollow metal nano particles formed may be within a range from 80% to 120% of the average particle diameter of the hollow metal nano particles. Specifically, the particle diameter of the hollow metal nano particles may be within a range from 90% to 110% of the average particle diameter of hollow metal nano particles. When the particle diameter exceeds the range, the size of the hollow metal nano particles is overall irregular, and thus it may be difficult to secure an intrinsic physical property value required by the hollow metal nano particles. For example, when hollow metal nano particles having a particle diameter exceeding a range from 80% to 120% of the average particle diameter of the hollow metal nano particles are used as a catalyst, the activity of the catalyst may be a little insufficient.

In an exemplary embodiment of the present application, the fabrication method may further include, after the forming of the hollow metal nano particles, removing a surfactant inside hollows. The removing method is not particularly limited, and for example, a method of washing the surfactant with water may be used. The surfactant may be an anionic surfactant or a cationic surfactant.

The method for fabricating hollow metal nano particles according to an exemplary embodiment of the present application may further include, after the forming of the hollow metal nano particles, removing a first shell including a first metal by adding an acid to the hollow metal nano particles.

In an exemplary embodiment of the present application, the acid is not particularly limited, and for example, it is possible to use an acid selected from the group consisting of sulfuric acid, nitric acid, hydrochloric acid, perchloric acid, hydroiodic acid, and hydrobromic acid.

In an exemplary embodiment of the present application, after the hollow metal nano particles are formed, in order to precipitate the hollow metal nano particles included in the solution, the solution including the hollow metal nano particles may be centrifuged. It is possible to collect only the hollow metal nano particles separated after the centrifugation. If necessary, a process of sintering the hollow metal nano particles may be additionally performed.

According to an exemplary embodiment of the present application, it is possible to fabricate hollow metal nano particles having a uniform size of several nanometers. By methods in the related art, it was difficult to fabricate several nanometer-sized hollow metal nano particles, and it was more difficult to fabricate uniform-sized hollow metal nano particles.

In an exemplary embodiment of the present application, the hollow metal nano particles may have an average particle diameter of 30 nm or less, more specifically 20 nm or less, or 12 nm or less, or 10 nm or less. Alternatively, the hollow metal nano particles may have an average particle diameter of 6 nm or less. The hollow metal nano particles may have an average particle diameter of 1 nm or more. When the hollow metal nano particles have an average particle diameter of 30 nm or less, the nano particles are advantageous in that the nano particles may be used in various fields. Further, when the hollow metal nano particles have an average particle diameter of 20 nm or less, the hollow metal nano particles are more preferred. In addition, when the hollow metal nano particles have an average particle diameter of 10 nm or less, or 6 nm or less, the surface area of particles is further increased, and thus the hollow metal nano particles are advantageous in that the applicability which may be used in various fields is further broadened. For example, when the hollow metal nano particles formed to have the particle diameter range are used as a catalyst, the efficiency thereof may be significantly enhanced.

According to an exemplary embodiment of the present application, the average particle diameter of the hollow metal nano particles means a value obtained by measuring 200 or more hollow metal nano particles using a graphic software (MAC-View), and measuring an average particle diameter through an obtained statistical distribution.

According to an exemplary embodiment of the present application, the hollow metal nano particles may have an average particle diameter from 1 nm to 30 nm.

According to an exemplary embodiment of the present application, the hollow metal nano particles may have an average particle diameter from 1 nm to 20 nm.

According to an exemplary embodiment of the present application, the hollow metal nano particles may have an average particle diameter from 1 nm to 12 nm.

According to an exemplary embodiment of the present application, the hollow metal nano particles may have an average particle diameter from 1 nm to 10 nm.

According to an exemplary embodiment of the present application, the hollow metal nano particles may have an average particle diameter from 1 nm to 6 nm.

In an exemplary embodiment of the present application, the shell portion in the hollow metal nano particles may have a thickness more than 0 nm and 5 nm or less, more specifically, more than 0 nm and 3 nm or less.

For example, the hollow metal nano particles may have an average particle diameter of 30 nm or less, and the shell portion may have a thickness more than 0 nm and 5 nm or less. More specifically, the hollow metal nano particles may have an average particle diameter of 20 nm or less, or 10 nm or less, and the shell portion may have a thickness more than 0 nm and 3 nm or less. According to an exemplary embodiment of the present application, the hollow metal nano particles may have an average particle diameter from 1 nm to 10 nm, specifically, from 1 nm to 4 nm. Furthermore, each shell may have a thickness from 0.25 nm to 5 nm, specifically, from 0.25 nm to 3 nm. The shell portion may also be a shell formed by mixing the first metal and the second metal, and may be a plurality of shells including a first shell and a second shell which are separately formed by varying the mixing ratio of a first metal and a second metal, respectively. Alternatively, the shell portion may be a plurality of shells including a first shell including only a first metal and a second shell including only a second metal.

According to an exemplary embodiment of the present application, the hollow volume of the hollow metal nano particles fabricated by the fabrication method may be 50% by volume or more of, specifically 70% by volume or more of, and more specifically 80% by volume or more of the total volume of the hollow metal nano particles.

The hollow metal nano particles fabricated by the fabrication method of the present application may be used while replacing existing nano particles in the field in which nano particles may be generally used. The hollow metal nano particles of the present application have much smaller sizes and wider specific surface areas than the nano particles in the related art, and thus may exhibit better activity than the nano particles in the related art. Specifically, the hollow metal nano particles of the present application may be used in various fields such as a catalyst, drug delivery, and a gas sensor. The hollow metal nano particles may be used as a catalyst, or as an active material formulation in cosmetics, pesticides, animal nutrients, or food supplements, and may be used as a pigment in electronic products, optical elements, or polymers.

An exemplary embodiment of the present application provides hollow metal nano particles fabricated by the fabrication method.

The hollow metal nano particles according to an exemplary embodiment of the present application may be hollow metal nano particles including at least one shell including: a hollow core; and a first metal and/or a second metal.

In an exemplary embodiment of the present application, the shell may have a single layer, and two or more layers.

In an exemplary embodiment of the present application, when the shell has a single layer, the first metal and the second metal may be present while being mixed. At this time, the first metal and the second metal may be mixed uniformly or non-uniformly.

In an exemplary embodiment of the present application, when the shell has a single layer, the atomic percentage ratio of the first metal to the second metal of the shell portion may be 1:5 to 10:1.

In an exemplary embodiment of the present application, when the shell has a single layer, the first metal and the second metal in the shell may be present in a state of gradation, the first metal may be present in an amount of 50% by volume or more, or 70% by volume or more at a portion adjacent to the hollow core in the shell, and the second metal may be present in an amount of 50% by volume or more or 70% by volume or more at a surface portion adjacent to the external portion in the shell.

In an exemplary embodiment of the present application, when the shell has a single layer, the shell may include only the first metal or the second metal.

The hollow metal nano particles according to an exemplary embodiment of the present application may include: a hollow core; one or two or more first shells including a first metal; and one or two or more second shells including a second metal.

The second shell may be present in at least one region of the outer surface of the first shell, and may be present in the form of surrounding the entire surface of the outer surface of the first shell. When the second shell is present in some regions of the outer surface of the first shell, the second shell may also be present in the form of a discontinuous surface.

In an exemplary embodiment of the present application, the hollow metal nano particles may include a hollow core, a first shell including a first metal formed throughout the outer surface of the hollow core, and a second shell including a second metal formed throughout the outer surface of the first shell. Alternatively, in an exemplary embodiment of the present application, the hollow metal nano particles may include a shell of a single layer including a first metal and a second metal, which are formed throughout the outer surface of the hollow core. In this case, the hollow metal nano particles may also include a surfactant having positive charges in the hollow core.

In an exemplary embodiment of the present application, the hollow metal nano particles may include a hollow core, a first shell in which a first metal salt carrying positive charges is present in at least one region of the external portion of hollows, and a second shell in which a second metal carrying negative charges is present in at least one region of the outer surface of the first shell. In this case, the hollow metal nano particles may also include a surfactant having negative charges in the hollow core.

Hereinafter, the present application will be described in detail with reference to Examples for a specific description. However, the Examples according to the present application may be modified in various forms, and the scope of the present application is not interpreted as being limited to the Examples described in detail below. The Examples of the present application are provided for more completely explaining the present application to those skilled in the art.

Example 1

0.03 mmol of $Ni(NO_3)_2$ as a first metal salt, 0.01 mmol of $K_2PtCl_4$ as a second metal salt, 0.1 mmol of trisodium citrate as a stabilizer, and 0.48 mmol of sodium dodecylsulfate (SDS) as a surfactant were added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the SDS measured was approximately two times the critical micelle concentration (CMC) to water.

Subsequently, 0.13 mmol of $NaBH_4$ which is a reducing agent and 100 mg of polyvinyl pyrrolidone (PVP) as a non-ionic surfactant were added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core, a first shell including Ni, and a second shell including Pt.

Figure 2:
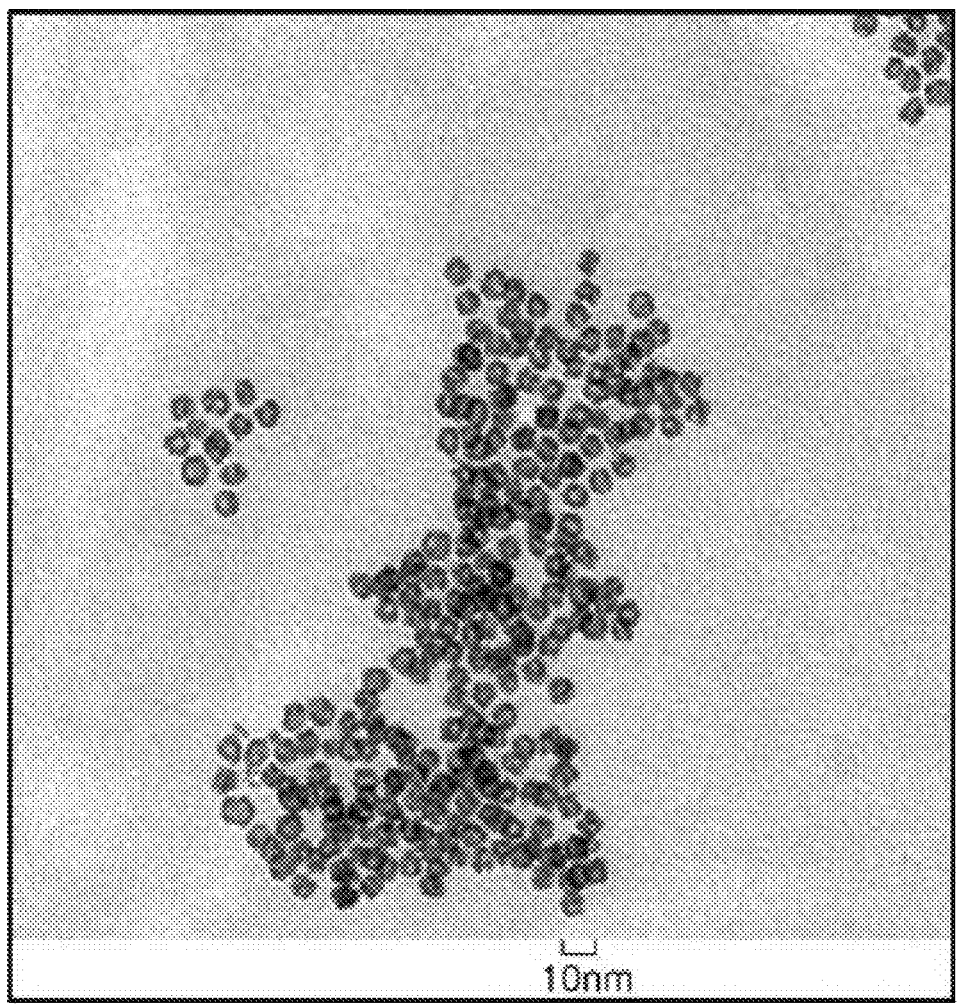
FIG. 2 illustrates a transmission electron microscope (TEM) image of the hollow metal nano particles fabricated according to Example 1.
Figure 3:
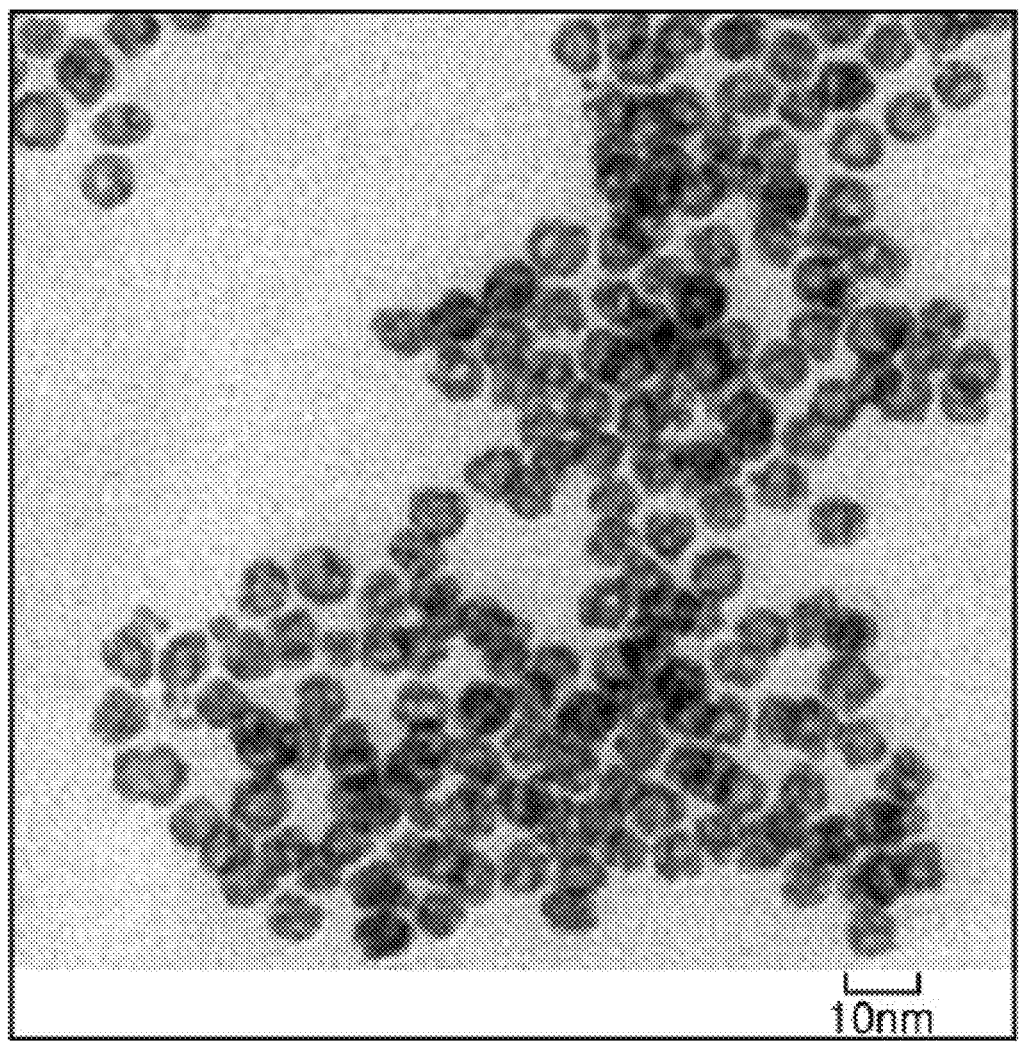
FIG. 3 illustrate a transmission electron microscope (TEM) image of the hollow metal nano particles fabricated according to Example 1, which is magnified two times more than the image of FIG. 2.

FIG. 1 illustrates a model of the hollow metal nano particles fabricated according to Example 1. FIG. 2 illustrates a transmission electron microscope (TEM) image of the hollow metal nano particles fabricated according to Example 1. FIG. 3 illustrates a transmission electron microscope (TEM) image of the hollow metal nano particles fabricated according to Example 1, which is magnified two times more than the image of FIG. 2.

The particle diameter of hollow metal nano particles obtained by a Scherrer equation calculation method on the HR-TEM of FIG. 3 was approximately less than 10 nm. The particle diameter of hollow metal nano particles formed was measured on 200 or more hollow metal nano particles using a graphic software (MAC-View) based on FIG. 3, the average particle diameter was 10 nm through a statistical distribution obtained, and the standard deviation was calculated as 7.8%.

Example 2

0.03 mmol of $Ni(NO_3)_2$ as a first metal salt, 0.01 mmol of $K_2PtCl_4$ as a second metal salt, 0.1 mmol of trisodium citrate as a stabilizer, and 1 ml of 30% ammonium laurylsulfate (ALS) as a surfactant were added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the ALS measured was approximately two times the critical micelle concentration (CMC) to water.

Subsequently, 0.13 mmol of $NaBH_4$ which is a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

Figure 7:
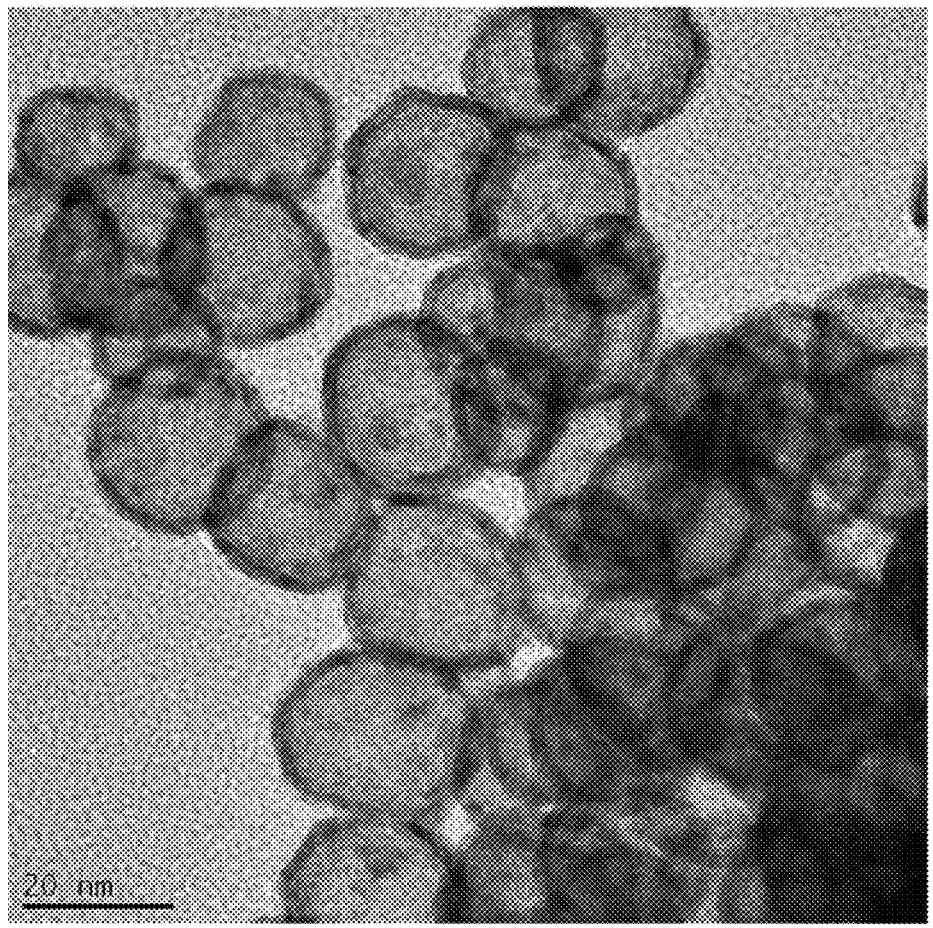
FIG. 7 illustrates a transmission electron microscope (TEM) image of hollow metal nano particles fabricated according to Example 2.

FIG. 7 illustrates a transmission electron microscope (TEM) image of the hollow metal nano particles fabricated according to Example 2.

The average particle diameter of the hollow metal nano particles obtained by Example 2 was 15 nm.

Example 3

0.03 mmol of $Ni(NO_3)_2$ as a first metal salt, 0.01 mmol of $K_2PtCl_4$ as a second metal salt, 0.12 mmol of trisodium citrate as a stabilizer, and 1 ml of 30% ammonium laurylsulfate (ALS) as a surfactant were added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the ALS measured was approximately 1.5 times the critical micelle concentration (CMC) to water.

Subsequently, 0.13 mmol of $NaBH_4$ which is a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

Figure 8:
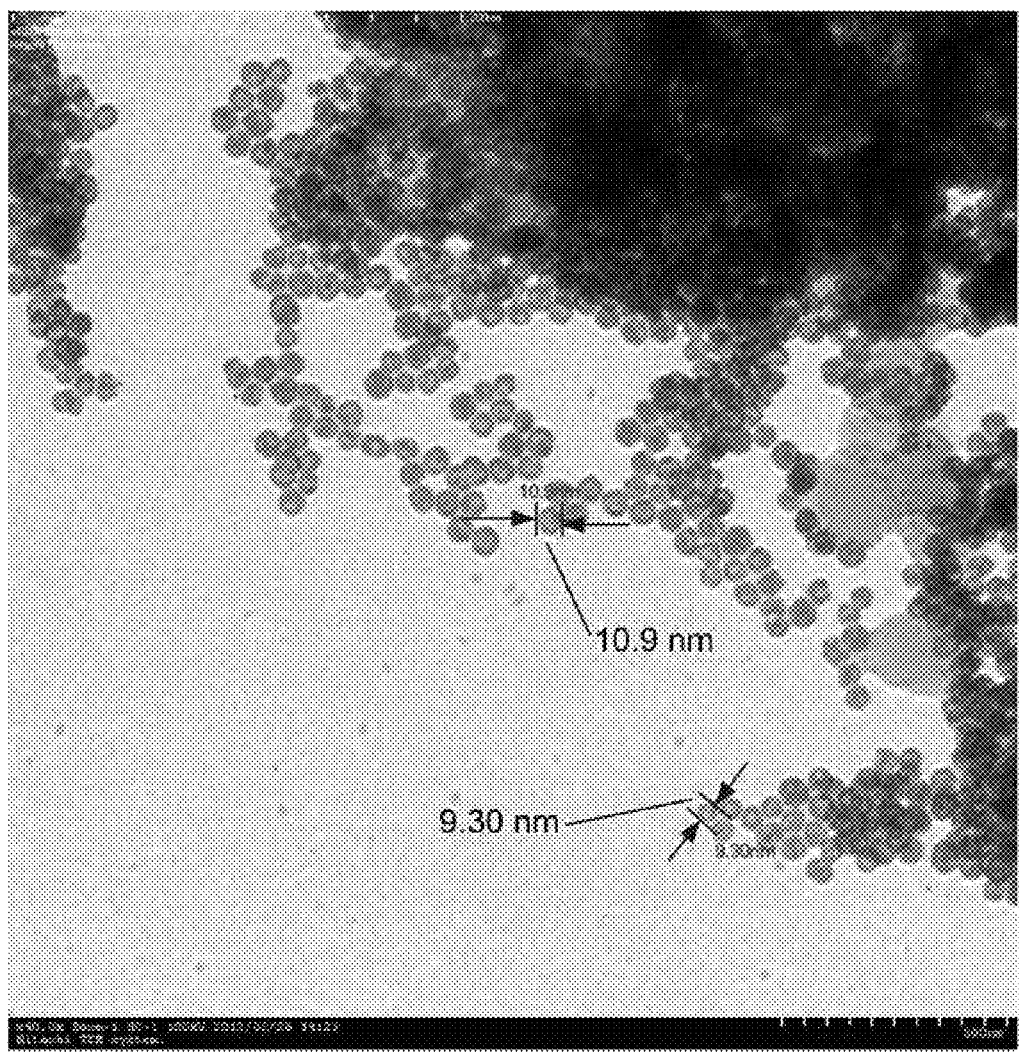
FIG. 8 illustrates a transmission electron microscope (TEM) image of hollow metal nano particles fabricated according to Example 3.

FIG. 8 illustrates a transmission electron microscope (TEM) image of the hollow metal nano particles fabricated according to Example 3.

The average particle diameter of the hollow metal nano particles obtained by Example 3 was 10 nm.

Example 4

0.03 mmol of $Ni(NO_3)_2$ as a first metal salt, 0.01 mmol of $K_2PtCl_4$ as a second metal salt, 0.1 mmol of trisodium citrate as a stabilizer, and 0.45 mmol of lithium dodecylsulfate (LiDS) as a surfactant are added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the LiDS measured was approximately two times the critical micelle concentration (CMC) to water.

Subsequently, 0.13 mmol of $NaBH_4$ which is a reducing agent was added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

Figure 9:
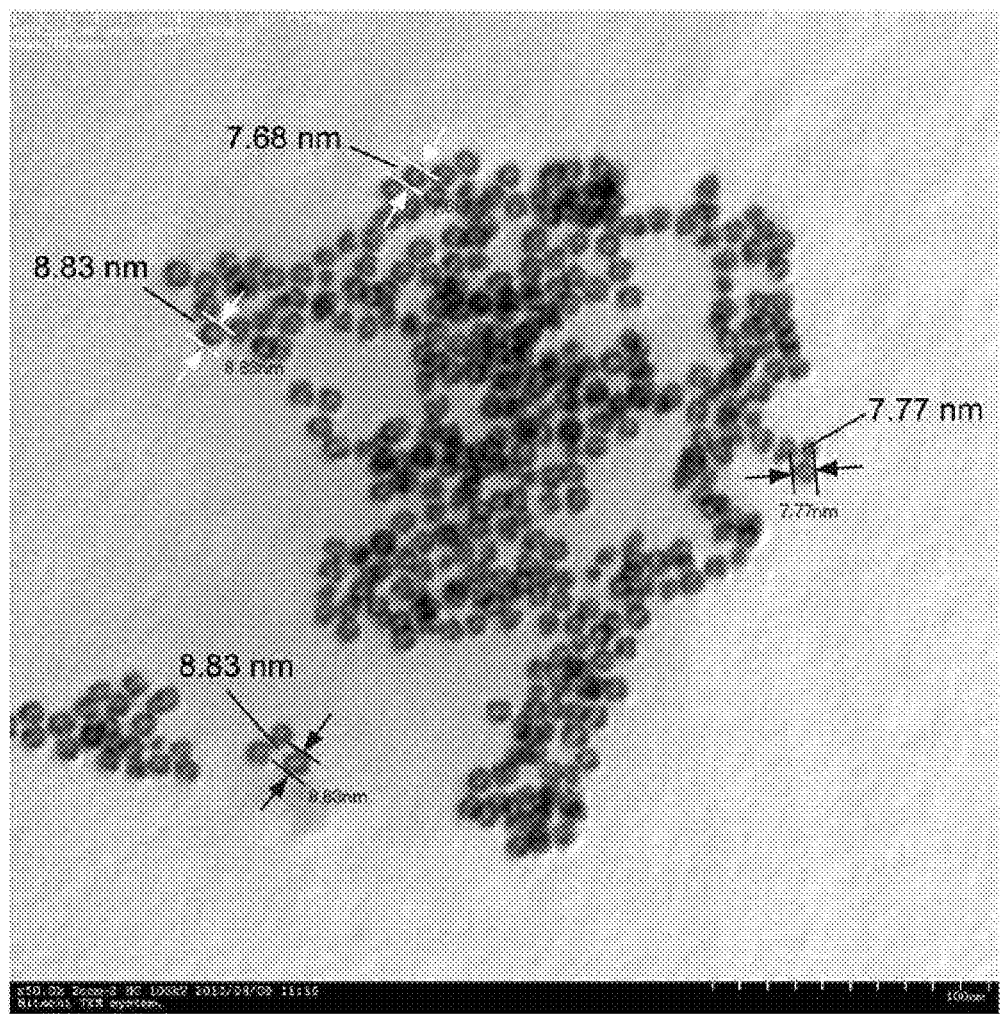
FIG. 9 illustrates a transmission electron microscope (TEM) image of hollow metal nano particles fabricated according to Example 4.

FIG. 9 illustrates a transmission electron microscope (TEM) image of the hollow metal nano particles fabricated according to Example 4.

The average particle diameter of the hollow metal nano particles obtained by Example 4 was 8 nm.

Example 5

0.07 mmol of $Ni(NO_3)_2$ as a first metal salt, 0.03 mmol of $K_2PtCl_4$ as a second metal salt, 0.12 mmol of trisodium citrate as a stabilizer, and 1.21 mmol of sodium dodecylsulfate (SDS) as a surfactant are added to and dissolved in 26 ml of water to form a solution, and the solution was stirred for 30 minutes. At this time, the molar ratio of $Ni(NO_3)_2$ to $K_2PtCl_4$ was 2:1, and at this time, the concentration of the SDS measured was approximately five times the critical micelle concentration (CMC) to water.

Subsequently, 0.4 mmol of $NaBH_4$ which is a reducing agent and 500 mg of polyvinyl pyrrolidone (PVP) as a non-ionic surfactant were added to the solution and the mixture was left to react for 30 minutes. After the mixture was centrifuged at 10,000 rpm for 10 minutes, the supernatant in the upper layer was discarded, the remaining precipitate was re-dispersed in 20 ml of water, and then the centrifugation process was repeated once more to fabricate hollow metal nano particles composed of a hollow core and a shell.

Figure 5:
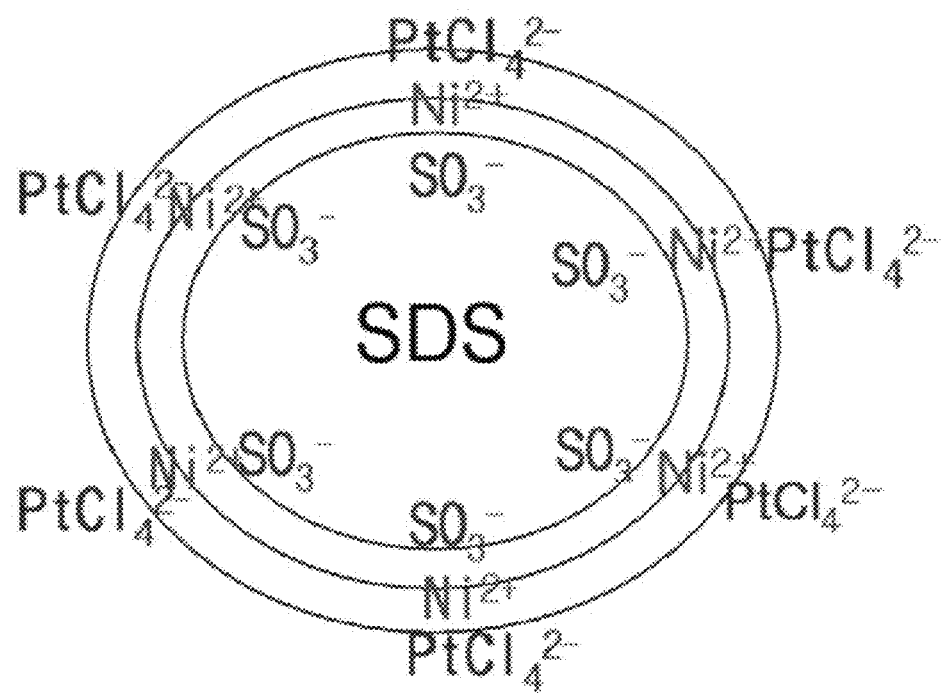
FIG. 5 illustrates a model of hollow metal nano particles in which a surfactant is included, among hollow metal nano particles fabricated according to Example 5.
Figure 6:
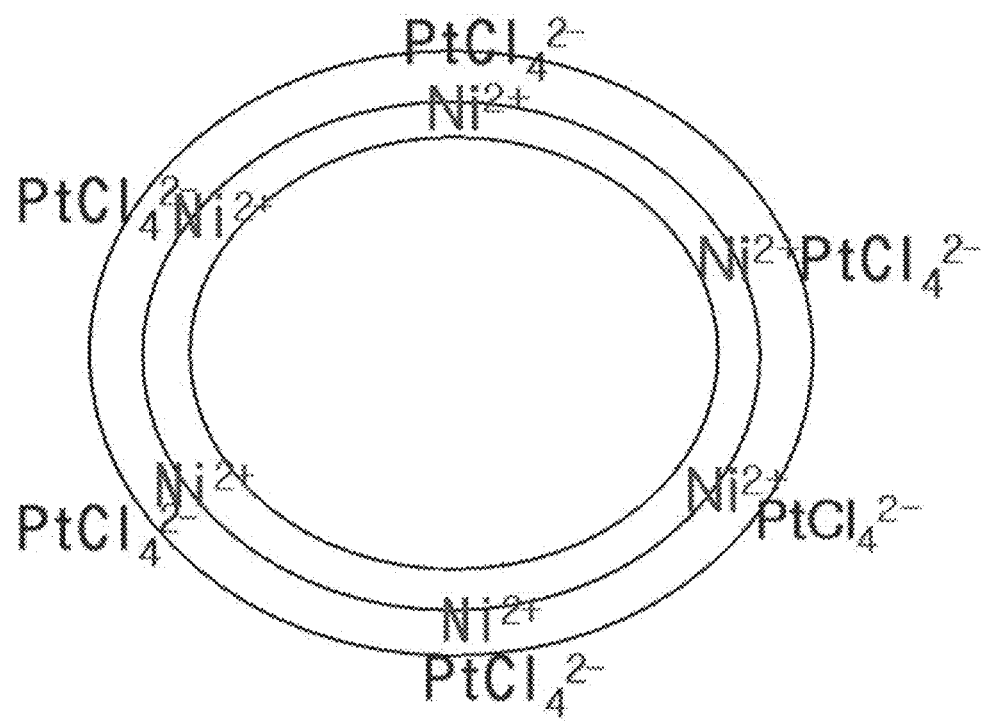
FIG. 6 illustrates a model of hollow metal nano particles from which a surfactant is removed, among the hollow metal nano particles fabricated according to Example 5.
Figure 10:
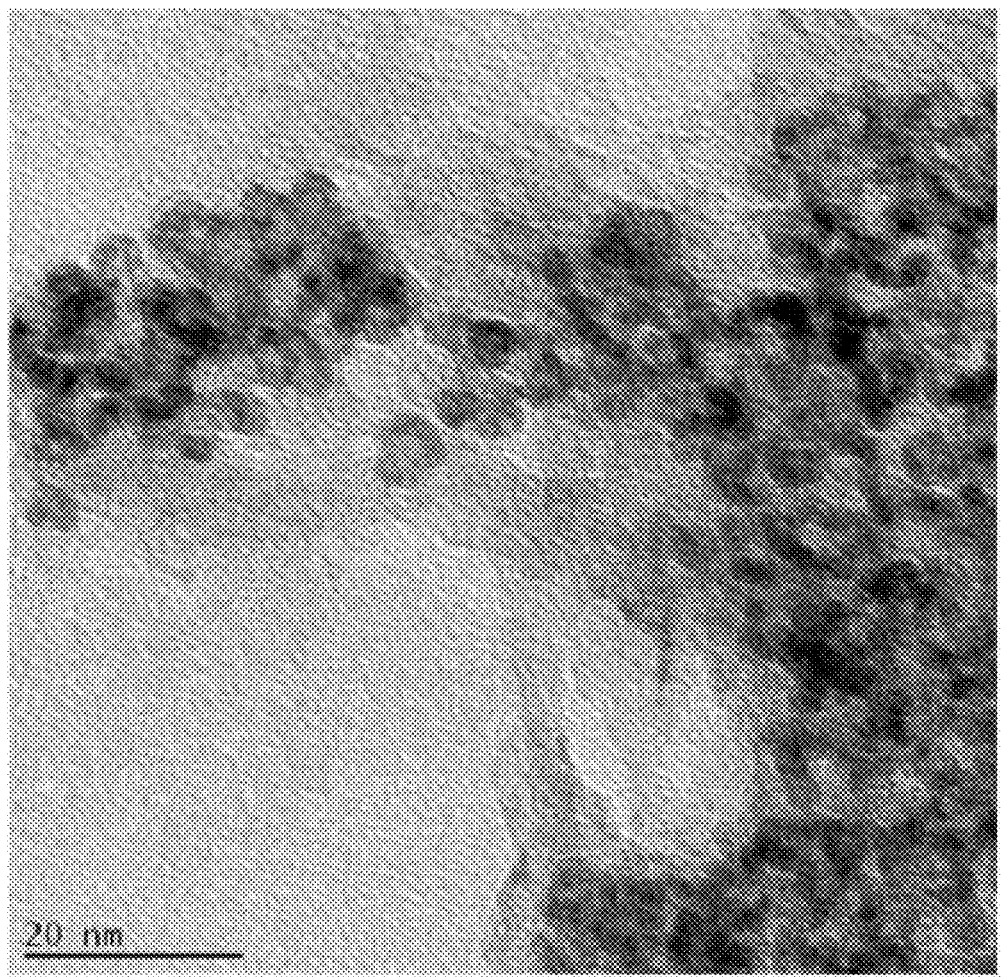
FIG. 10 illustrates a transmission electron microscope (TEM) image of hollow metal nano particles fabricated according to Example 5.

FIGS. 5 and 6 illustrate a model of the hollow metal nano particles fabricated according to Example 5. FIG. 10 illustrates a transmission electron microscope (TEM) image of the hollow metal nano particles fabricated according to Example 5.

The average particle diameter of the hollow metal nano particles obtained by Example 5 was about 5 nm.

Comparative Example 1

0.03 mmol of $Ni(NO_3)_2$ as a first metal salt, 0.01 mmol of $K_2PtCl_4$ as a second metal salt, 0.1 mmol of trisodium citrate as a stabilizer, and 0.45 mmol of sodium dodecylsulfate (SDS) as a surfactant are added to and dissolved in 26 ml of water to form a solution, and the solution was stirred for 30 minutes. At this time, the molar ratio of $Ni(NO_3)_2$ to $K_2PtCl_4$ was 3:1, and at this time, the concentration of the SDS measured was approximately ten times the critical micelle concentration (CMC) to water.

Subsequently, 0.13 mmol of $NaBH_4$ which is a reducing agent and 100 mg of polyvinyl pyrrolidone (PVP) as a nonionic surfactant were added to the solution and the mixture was left to react for 30 minutes.

Figure 4:
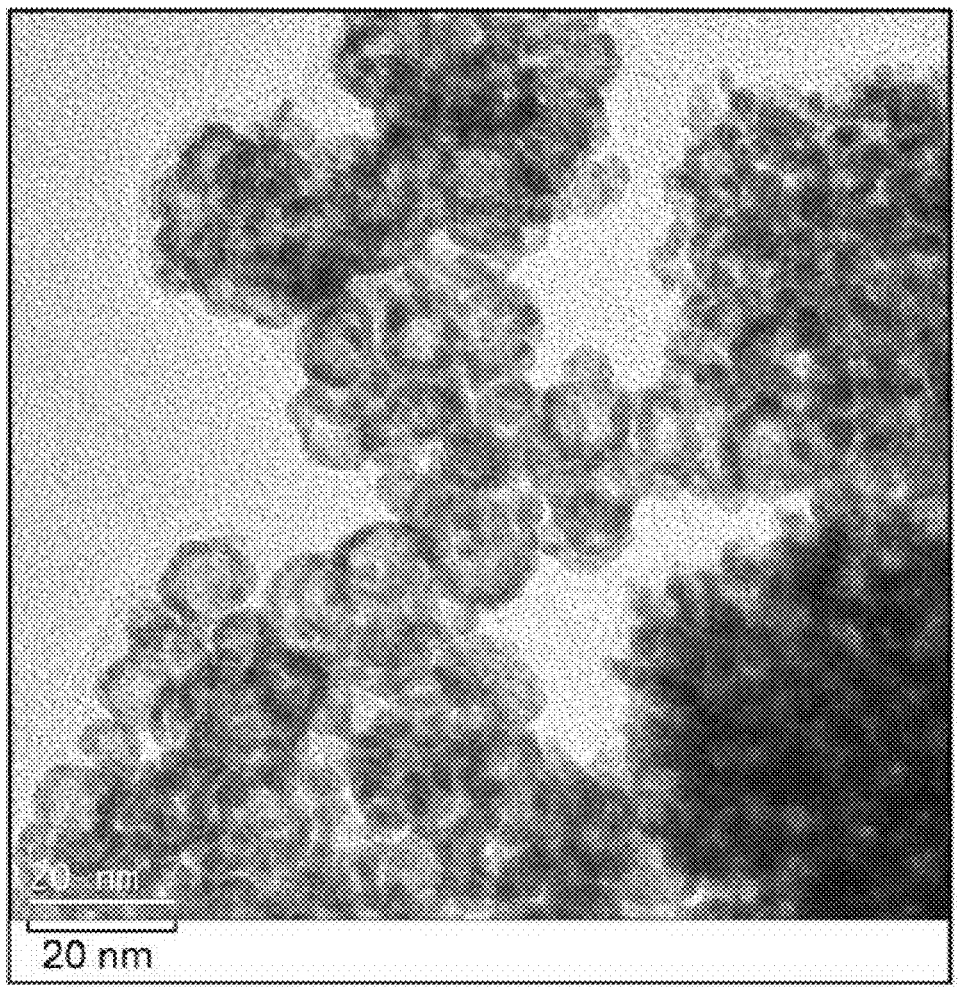
FIG. 4 illustrates a transmission electron microscope (TEM) image of hollow metal nano particles fabricated according to Comparative Example 1.

FIG. 4 illustrates a transmission electron microscope (TEM) image of the hollow metal nano particles fabricated according to Comparative Example 1. In the case of Comparative Example 1, some of hollow metal nano particles were also observed, but particles formed by aggregation of small particles and having a large size more than 30 nm were also observed.

The Examples of the present application have been described with reference to the accompanying drawings, but the present application is not limited to the Examples and may be fabricated in various forms, and it will be understood by a person with ordinary skill in the art to which the present application pertains that the present application may be implemented in other specific forms without modifying the technical spirit or essential feature of the present application. Therefore, it is to be appreciated that Examples described above are intended to be illustrative in every sense, and not restrictive.

What is claimed is:

1. A method for fabricating hollow metal nano particles, the method comprising:
   forming a solution by adding a first metal salt, a second metal salt, and a surfactant to a solvent; and
   forming hollow metal nano particles by adding a reducing agent to the solution,
   wherein the forming of the solution comprises forming a micelle by the surfactant, and surrounding an outer portion of the micelle with the first metal salt and the second metal salt, and
   the forming of the hollow metal nano particles comprises forming the micelle region to a hollow form,
   wherein a molar ratio of the first metal salt to the second metal salt in the solution is 1:5 to 10:1,
   wherein the solvent is water,
   wherein a concentration of the surfactant in the solution is one time to five times of a critical micelle concentration (CMC) to water, and the hollow metal nano particles have an average particle diameter of 30 nm or less.

2. The method of claim 1, wherein a carbon number of the chains of the surfactant is 15 or less.

3. The method of claim 1, wherein the surfactant is an anionic surfactant.

4. The method of claim 3, wherein the anionic surfactant comprises $NH_4^+$, $K^+$, $Na^+$, or $Li^+$ as a counter ion.

5. The method of claim 3, wherein the anionic surfactant is selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and salts thereof, glyceryl ester, sodium carboxymethylcellulose, bile acid and salts thereof, cholic acid, deoxycholic acid, glycocholic acid, taurocholic acid, glycodeoxycholic acid, alkyl sulfonate, aryl sulfonate, alkyl phosphate, alkyl sulfonate, stearic acid and salts thereof, calcium stearate, phosphate, sodium carboxymethyl cellulose, dioctyl sulfosuccinate, dialkyl ester of sodium sulfosuccinic acid, phospholipid and calcium carboxymethyl cellulose.

6. The method of claim 1, wherein the surfactant is a cationic surfactant.

7. The method of claim 6, wherein the cationic surfactant comprises $I^-$, $Br^-$, or $Cl^-$ as a counter ion.

8. The method of claim 6, wherein the cationic surfactant is selected from the group consisting of quaternary ammonium compounds, benzalkonium chloride, cetyl trimethyl ammonium bromide, chitonic acid, lauryl dimethyl benzyl ammonium chloride, acyl carnitine hydrochloride, alkyl pyridinium halide, cetylpyridinium chloride, cationic lipids, polymethylmethacrylate trimethyl ammonium bromide, sulfonium compounds, polyvinylpyrrolidone-2-dimethylaminoethyl methacrylate dimethyl sulfate, hexadecyl trimethyl ammonium bromide, phosphonium compounds, quaternary ammonium compounds, benzyl-di(2-chloroethyl)ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride, decyl dimethyl hydroxyethyl ammonium chloride bromide, $C_{12-15}$-dimethyl hydroxyethyl ammonium chloride, $C_{12-15}$-dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulphate, lauryl dimethyl benzyl ammonium chloride, lauryl dimethyl benzyl ammonium bromide, lauryl dimethyl (ethenoxy)$_4$ ammonium chloride, lauryl dimethyl (ethenoxy)$_4$ ammonium bromide, N-alkyl ($C_{12-18}$)dimethylbenzyl ammonium chloride, N-alkyl ($C_{14-18}$)dimethylbenzyl ammonium chloride, N-tetradecyldimethylbenzyl ammonium chloride monohydrate, dimethyl didecyl ammonium chloride, N-alkyl ($C_{12-14}$)dimethyl 1-naphthylmethyl ammonium chloride, trimethylammonium halide alkyl -trimethylammonium salts, dialkyl-dimethylammonium salts, lauryl trimethyl ammonium chloride, ethoxylated alkyamidoalkyldialkylammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12-14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromide, dodecylbenzyl triethyl ammonium chloride, polydiallyldimethylammonium chloride, dimethyl ammonium chloride, alkyldimethylammonium halogenide, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline ester, benzalkonium chloride, stearalkonium chloride, cetyl pyridinium bromide, cetyl pyridinium chloride, halide salts of quaternized polyoxyethylalkylamines, MIRAPOL Alkaquat, alkyl pyridinium salts, amine, amine salts, imide azolinium salts, protonated quaternary acrylamides, methylated quaternary polymers, cationic gua gum, benzalkonium chloride, dodecyl trimethyl ammonium bromide, triethanolamine, and poloxamine.

9. The method of claim 1, wherein the forming of the hollow metal nano particles comprises further adding a non-ionic surfactant.

10. The method of claim 9, wherein the non-ionic surfactant is selected from the group consisting of polyoxyethylene fatty alcohol ether, polyoxyethylene sorbitan fatty acid ester, polyoxyethylene fatty acid ester, polyoxyethylene alkyl ether, polyoxyethylene castor oil derivatives, sorbitan ester, glyceryl ester, glycerol monostearate, polyethylene glycol, polypropylene glycol, polypropylene glycol ester, cetyl alcohol, cetostearyl alcohol, stearyl alcohol, aryl alkyl polyether alcohol, polyoxyethylene polyoxypropylene copolymers, poloxamer, poloxamine, methylcellulose, hydroxycellulose, hydroxymethylcellulose, hydroxyethylcellulose, hydroxypropylcellulose, hydroxypropylmethylcellulose, hydroxypropylmethylcellulose phthalate, noncrystalline cellulose, polysaccharides, starch, starch derivatives, hydroxyethyl starch, polyvinyl alcohol, triethanolamine stearate, amine oxide, dextran, glycerol, gum acacia, cholesterol, tragacanth, and polyvinylpyrrolidone.

11. The method of claim 1, wherein the forming of the hollow metal nano particles comprises further adding a stabilizer.

12. The method of claim 11, wherein the stabilizer comprises one or two or more selected from the group consisting of disodium phosphate, dipotassium phosphate, disodium citrate, and trisodium citrate.

13. The method of claim 1, wherein the first metal of the first metal salt and the second metal of the second metal salt are each independently selected from the group consisting of metals belonging to Group 3 to Group 15 of the periodic table, metalloids, lanthanide metals, and actinide metals.

14. The method of claim 1, wherein the first metal of the first metal salt and the second metal of the second metal salt are each independently selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

15. The method of claim 1, wherein the first meal salt and the second metal salt are nitrate, halide, hydroxide, or sulfate of the first metal and the second metal, respectively.

16. The method of claim 1, wherein the fabrication method is carried out at normal temperature.

17. The method of claim 1, wherein the reducing agent has a standard reduction potential of $-0.23$ V or less.

18. The method of claim 1, wherein the reducing agent is one or two or more selected from the group consisting of $NaBH_4$, $NH_2NH_2$, $LiAlH_4$, and $LiBEt_3H$.

19. The method of claim 1, wherein an average particle diameter of the hollow metal nano particles is within a range from 80% to 120% of an average particle diameter of hollow metal nano particles.

20. The method of claim 1, further comprising:
removing a surfactant inside the hollow metal nano particles after the forming of the hollow metal nano particles.

21. The method of claim 1, wherein the hollow metal nano particles have an average particle diameter of 20 nm or less.

22. The method of claim 1, wherein the hollow metal nano particles have an average particle diameter of 10 nm or less.

23. The method of claim 1, wherein the hollow metal nano particles have an average particle diameter of 6 nm or less.

24. The method of claim 1, wherein the hollow metal nano particles have a spherical shape.

25. The method of claim 1, wherein a volume of the hollows is 50% by volume or more of a total volume of the hollow metal nano particles.

26. The method of claim 1, wherein the hollow metal nano particles comprise:
a hollow core;
at least one first shell comprising a first metal; and
at least one second shell comprising a second metal.

27. The method of claim 1, wherein the hollow metal nano particles comprise:
a hollow core; and
at least one shell comprising a first metal and a second metal.

28. The method of claim 26, wherein each of the shells has a thickness of 5 nm or less.

29. The method of claim 26, wherein each of the shells has a thickness of 3 nm or less.

* * * * *